US006987375B2

(12) United States Patent
Chen

(10) Patent No.: US 6,987,375 B2
(45) Date of Patent: Jan. 17, 2006

(54) DUAL-STAGE DRIVE FOR SWITCHED RELUCTANCE ELECTRIC MACHINES

(75) Inventor: Shaotang Chen, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/283,880

(22) Filed: Oct. 30, 2002

(65) Prior Publication Data

US 2004/0085040 A1  May 6, 2004

(51) Int. Cl.
*H02P 7/36* (2006.01)
(52) U.S. Cl. ............... 318/701; 318/138; 318/254; 318/700; 318/737
(58) Field of Classification Search ............ 318/138, 318/254, 244, 246, 519, 700, 701, 737
See application file for complete search history.

(56) References Cited

U.S. PATENT DOCUMENTS

| | | | | | |
|---|---|---|---|---|---|
| 3,560,818 | A | * | 2/1971 | Amato | 318/138 |
| 4,387,326 | A | * | 6/1983 | Ray et al. | 318/138 |
| 5,563,487 | A | * | 10/1996 | Davis | 318/701 |
| 5,754,024 | A | | 5/1998 | Sugiyama | 318/701 |
| 5,764,019 | A | * | 6/1998 | Webster | 318/701 |
| 5,847,532 | A | * | 12/1998 | Webster | 318/701 |
| 5,850,133 | A | * | 12/1998 | Heglund | 318/700 |
| 5,936,373 | A | * | 8/1999 | Li et al. | 318/701 |
| 5,939,854 | A | * | 8/1999 | Pyo | 318/701 |
| 5,973,431 | A | * | 10/1999 | Li et al. | 310/168 |
| 6,005,321 | A | * | 12/1999 | Bolton et al. | 310/168 |
| 6,037,740 | A | * | 3/2000 | Pollock et al. | 318/701 |
| 6,054,819 | A | * | 4/2000 | Pengov | 318/254 |
| 6,194,804 | B1 | * | 2/2001 | Nashiki | 310/166 |
| 6,242,874 | B1 | | 6/2001 | Kalpathi et al. | 318/254 |
| 6,366,048 | B2 | | 4/2002 | Greif | 318/701 |
| 6,384,564 | B1 | * | 5/2002 | Pollock | 318/701 |
| 6,407,528 | B1 | | 6/2002 | Disser et al. | 318/701 |
| 6,411,060 | B1 | | 6/2002 | Jung | 318/701 |
| 6,452,356 | B1 | | 9/2002 | Sugiyama et al. | 318/599 |
| 6,479,959 | B2 | * | 11/2002 | Choe | 318/439 |
| 6,495,985 | B1 | * | 12/2002 | Mayes et al. | 318/701 |
| 6,628,105 | B1 | * | 9/2003 | Tankard | 322/94 |
| 6,693,403 | B2 | * | 2/2004 | Chen | 318/701 |
| 6,803,740 | B2 | * | 10/2004 | Mir et al. | 318/701 |

OTHER PUBLICATIONS

Mike Barnes and Charles Pollock, "Forward Converters for Dual Voltage Switched Reluctance Motor Drives", 2001 IEEE, pp. 83-91.*
Hong-Je Ryoo et al., "A New Split Source Type Converter for SRM Drives", 1998 IEEE, pp. 1290-1294.*

* cited by examiner

*Primary Examiner*—Marlon T. Fletcher
*Assistant Examiner*—Tyrone Smith
(74) *Attorney, Agent, or Firm*—Michael D. Smith

(57) ABSTRACT

A dual stage drive for a switched reluctance motor (SRM) is disclosed, the SRM having a plurality of phase coils associated therewith. In an exemplary embodiment, the dual stage drive includes at least one of the plurality of phase coils coupled to a first power bus, and at least another one of the plurality of phase coils coupled to a second power bus. Energy within the at least one phase coil coupled to said first power bus is dissipated through said second power bus.

17 Claims, 7 Drawing Sheets

DUAL-STAGE DRIVE FOR SWITCHED RELUCTANCE ELECTRIC MACHINES

BACKGROUND

The present disclosure relates generally to switched reluctance motor configurations and controls and, more particularly, to a dual stage drive for switched reluctance electric machines.

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles, wherein the windings around any two diametrically opposed stator poles may be connected in series or in parallel to define one motor phase of the multiphase SRM. The windings associated with a motor phase are also referred to as phase coils. Since phase coils are typically connected to the same bus voltage in order to produce symmetrical motor characteristic, they are generally constructed using the same number of turns to produce the same magnetic flux linkage under the same current excitation. By generating current through the phase coils, magnetic fields are established about the stator poles and a torque is thereby produced that attracts a pair of rotor poles into alignment with the stator poles.

The current in the phase coils is generated in a predetermined sequence in order to produce a constant torque on the rotor. The period during which current is provided to the phase coil (and during which the rotor poles are brought into alignment with the stator poles) is known as the "active stage" or conduction interval of the motor phase. At a certain point, either as the rotor poles become aligned with the stator poles or at some point prior thereto, it becomes desirable to commutate the current in the phase coil to prevent a negative or braking torque from acting on the rotor poles. Once this commutation point is reached, current is no longer generated in the phase coil and the current is allowed to dissipate from the phase coil. The period during which current is allowed to dissipate from the phase coil is known as the "inactive stage" of the motor phase.

During the inactive stage of the motor phase, the demagnetizing energy dissipated from the phase coils is typically fed back to the power source through one or more freewheeling diodes. However, depending upon the particular application of the SRM, this can pose significant limitations on the motor drive performance. For example, the feedback energy may cause interference to other equipment connected to or in proximity with the SRM power source, thereby constituting a significant source of electromagnetic interference (EMI). In addition, the energy feedback to the source also forces significant energy circulation between the SRM drive and the power source, thus producing additional losses in the path of supply current circulation. Still another drawback stems from the fact that a large DC capacitor is typically needed to filter the ripple current feedback.

SUMMARY

The above discussed and other drawbacks and deficiencies of the prior art are overcome or alleviated by a dual stage drive for a switched reluctance motor (SRM), the SRM having a plurality of phase coils associated therewith. In an exemplary embodiment, the dual stage drive includes at least one of the plurality of phase coils coupled to a first power bus, and at least another one of the plurality of phase coils coupled to a second power bus. Energy within the at least one phase coil coupled to said first power bus is dissipated through the second power bus.

In another aspect, a dual stage drive for a switched reluctance motor (SRM) having a plurality of phase coils associated therewith includes a DC power source coupled to a first DC bus, the first DC bus supplying phase current for a first group of the plurality of phase coils. A capacitor is coupled to a second DC bus, the second DC bus supplying phase current for a second group of the plurality of phase coils. The first group of phase coils is further coupled to the second DC bus such that residual energy present therein is discharged through the second DC bus.

In still another aspect, a switched reluctance motor (SRM) includes a rotor assembly having a plurality of salient rotor poles formed on an outer surface thereof. A stator assembly has a plurality of salient stator poles and a plurality of motor phase coils associated with the stator poles. Further, a dual stage drive circuit is used for energizing the plurality of motor phase coils. The drive circuit further includes a DC power source coupled to a first DC bus, the first DC bus supplying phase current for a first group of the plurality of phase coils. A capacitor is coupled to a second DC bus, the second DC bus supplying phase current for a second group of said plurality of phase coils. The first group of phase coils is further coupled to the second DC bus such that residual energy present therein is discharged through the second DC bus.

BRIEF DESCRIPTION OF THE DRAWINGS

Referring to the exemplary drawings wherein like elements are numbered alike in the several Figures.

DETAILED DESCRIPTION

Disclosed herein is a dual stage drive for switched reluctance motors (SRM). Briefly stated, the dual stage SRM drive circuit features two different DC buses with two sub motor stages, wherein the discharge current from each of the phase coils (regardless of the particular stage associated therewith) is directed to the DC bus that is separate from the power source. Thus configured, the dual stage SRM motor drive utilizes a unidirectional power flow to reduce EMI and improve operating efficiency.

As the two separate power busses may have different voltages, the motor windings may be divided into two different groups, each group designed for its corresponding DC voltage. In other words, the number of turns in a first group of phase coils may be different from the number of turns in a second group of coils. Moreover, the current in the first group of coils may be controlled at a level different from the second group of coils in order to allow all of the coils to convert the same amount of electrical energy into mechanical energy within one mechanical revolution.

Figure 1:
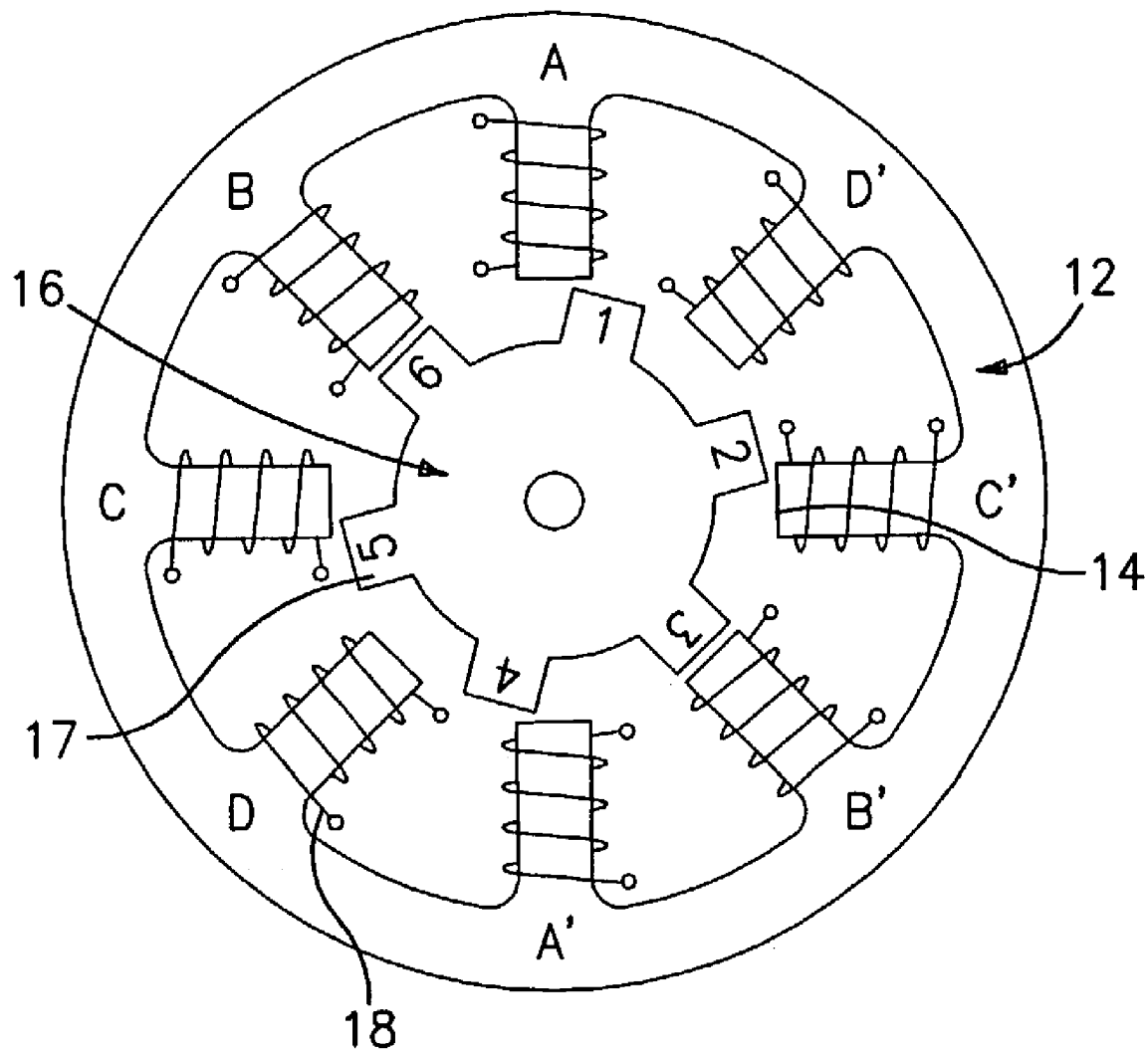
FIG. 1 is a schematic, cross-sectional view of an existing switched reluctance motor suitable for use in connection with an embodiment of the invention.

Referring initially to FIG. 1, there is shown in cross-section the primary components of a switched reluctance motor (SRM) 10 suitable for use in connection with an embodiment of the invention. The motor 10 includes a stator assembly 12 having a number of salient stator poles 14 associated therewith. Each stator pole 14 is paired with another diametrically opposite stator pole 14 to form a stator pole pair. The number of stator pole pairs determines the number of phases of the motor 10. In the embodiment depicted, the stator assembly 12 has four pole pairs (and thus four phases), designated by A–A', B–B', C–C' and D–D'. The stator assembly 12 may further include a plurality of laminations (not shown) made of a magnetically permeable material, such as iron.

In addition, a rotor assembly 16 also includes a plurality of salient rotor poles 17 formed on an outer surface thereof. As is the case with the stator poles 14, the rotor poles 17 are also preferably provided in diametrically opposed pairs. Although six rotor poles 17 (three rotor pole pairs) are shown on the illustrated rotor assembly 16, it should be appreciated that a greater or a lesser number of rotor poles 17 may be used in any particular configuration. However, for switched reluctance motors in general, the number of rotor poles 17 differs from the number of stator poles 14, as is well known. The three rotor pole pairs are depicted in FIG. 1 as 1-4, 2-5 and 3-6. Each stator pole pair is provided with a machine or motor phase coil 18 connected serially across the pole pair.

Figure 2:
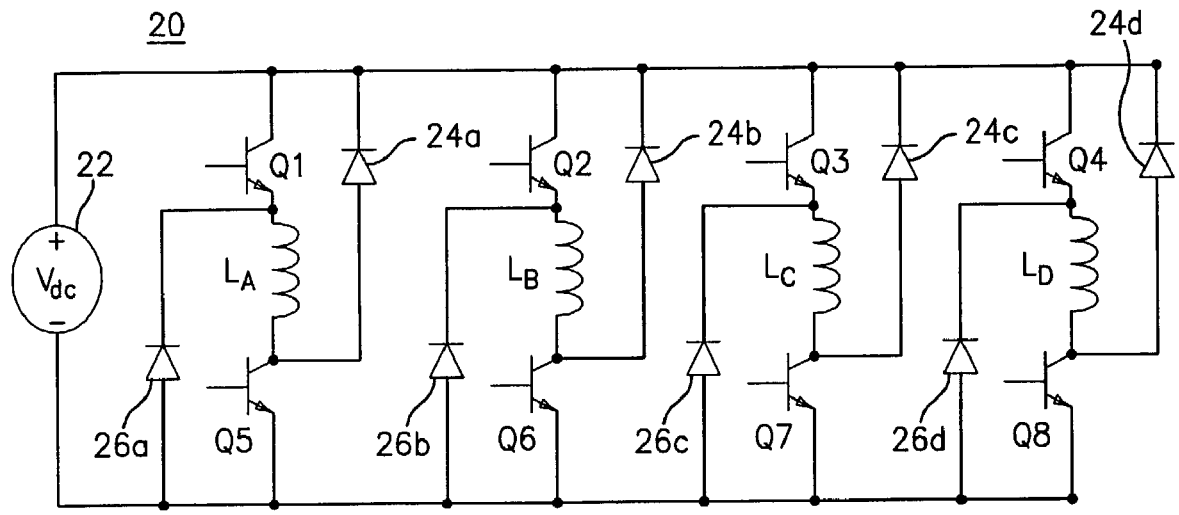
FIG. 2 is a schematic circuit diagram of a conventional SRM drive circuit for an exemplary four-phase SRM.

Referring now to FIG. 2, there is shown a schematic diagram of a conventional SRM drive circuit 20 for a four-phase switched reluctance motor drive suitable for use in connection with the SRM motor 10 in FIG. 1. It will be appreciated that although the drive circuit 20 is configured for a four-phase SRM, the principles disclosed hereinafter are applicable to motors having a different number of phases and, in general, to any brushless motor drive. Those skilled in the art will recognize the chopper controller configuration in which one end of each coil ($L_A$, $L_B$, $L_C$ and $L_D$) of the SRM is associated with a high-side switching transistor (Q1, Q2, Q3 and Q4, respectively) connected to the positive pole of a DC power source 22. The other end of each of the coils ($L_A$, $L_B$, $L_C$ and $L_D$) is associated with a low-side switching transistor (Q5, Q6, Q7 and Q8, respectively) connected to the negative pole of DC power source 22. The transistors may be, for example, MOSFETs or IGBTs. In addition, the drive circuit 20 includes a series of high-side freewheeling diodes 24a, 24b, 24c and 24d, as well a series of low-side freewheeling diodes 26a, 26b, 26c and 26d, that are reverse-biased with respect to the polarity of the DC voltage source 22.

Figure 3A:
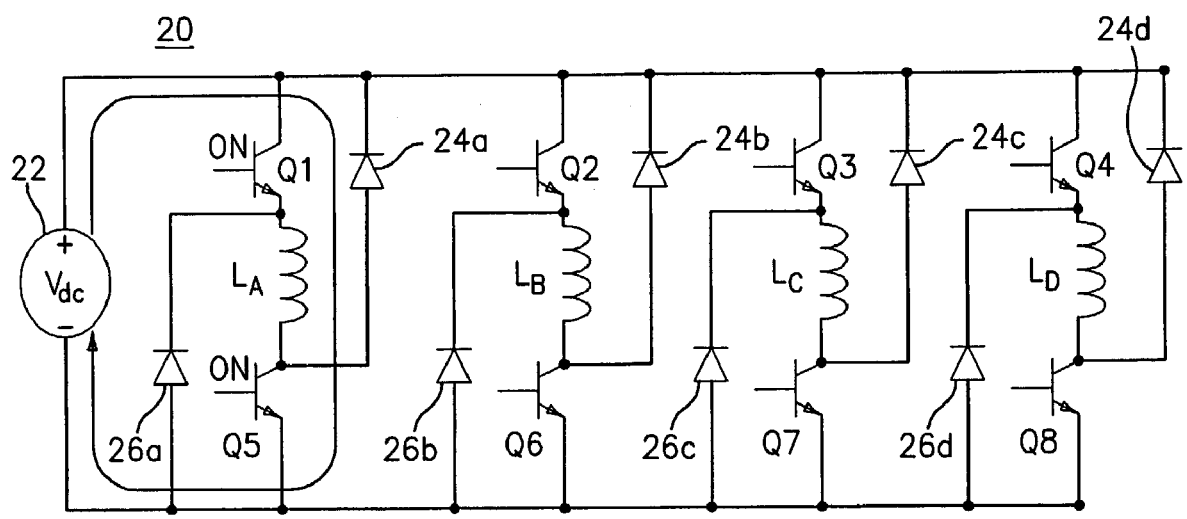
FIGS. 3(a) through 3(c) illustrate the SRM drive circuit of FIG. 2 during various conduction stages of the commutation cycle.
Figure 3B:
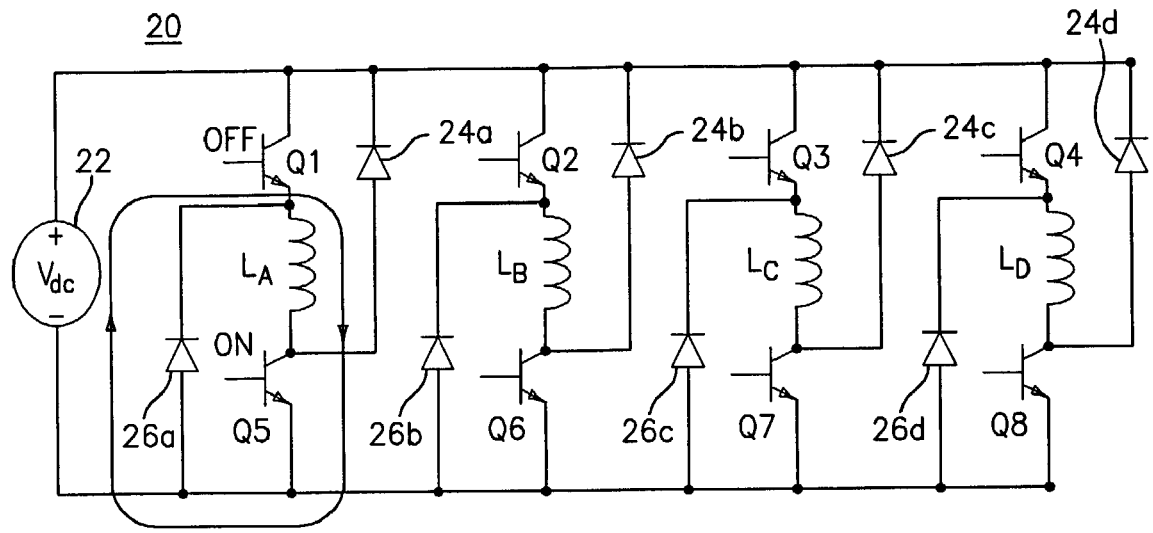
Figure 3C:
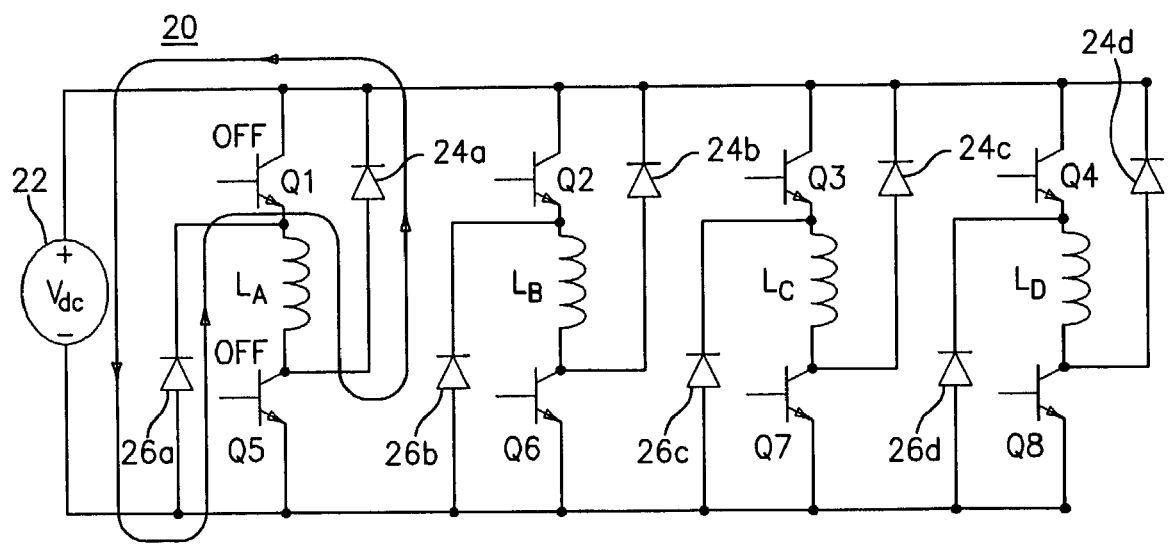

FIGS. 3(a) through 3(c) illustrate current flow through the drive circuit 20 during each conduction mode of the SRM 10. For ease of description, only the current path through the first phase of the drive circuit 20 is shown in FIGS. 3(a) through 3(c) in order to demonstrate the conduction cycle. As is shown in FIG. 3(a), the conduction in the motor phase "A" is commenced by turning on both high-side transistor Q1 and low-side transistor Q5. During this conduction mode, the current in phase "A" passes through coil $L_A$ via conducting transistors Q1 and Q5.

Once the current in phase "A" reaches the desired value, it is then regulated by PWM control of Q1 while Q5 remains on. FIG. 3(b) illustrates this "commutation mode" of conduction wherein the high-side transistor Q1 is turned off and the low-side transistor Q5 is left on. At this point, a feedback current caused by the voltage induced in $L_A$ flows through low-side freewheeling diode 26a. Then, in the third mode of conduction (i.e., the "freewheeling mode", both Q1 and Q5 are switched off, as shown in FIG. 3(c). Again, due to the induced voltage in $L_A$, current will now continue to flow through both through low-side freewheeling diode 26a and through high-side freewheeling diode 24a, effectively feeding power back to the DC source 22 before the energy in $L_A$ is finally dissipated. However, as mentioned previously, the feedback power to the DC source 22 may cause interference to other equipment connected to or in proximity with the DC source 22, thereby constituting a significant source of electromagnetic interference (EMI).

Figure 4:
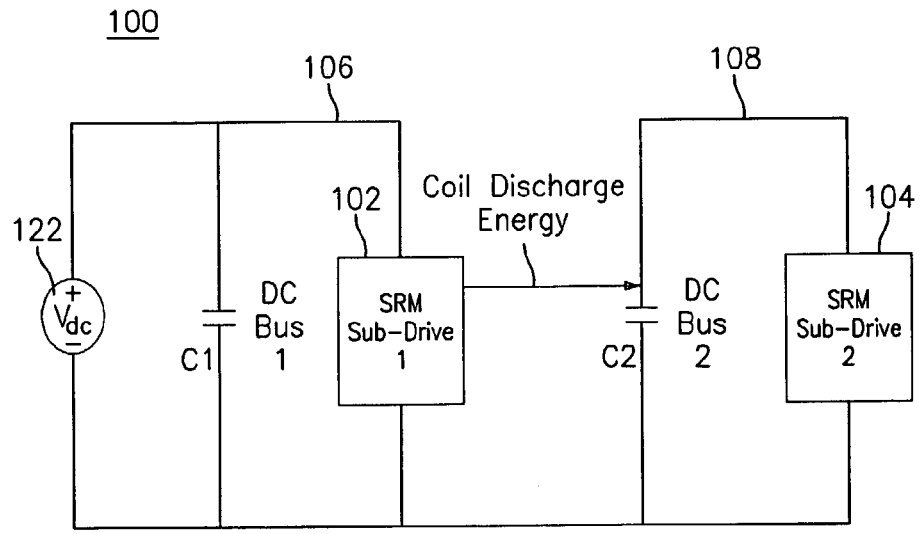
FIG. 4 is a schematic block diagram of a dual stage drive circuit for an SRM, in accordance with an embodiment of the present invention.

Accordingly, FIG. 4 is a schematic block diagram of a dual stage drive circuit 100 for switched reluctance motors, in accordance with an embodiment of the invention. The dual stage drive circuit 100 is used in conjunction with the SRM phase coils such that the phase coils are grouped into a first sub-drive 102 (SRM sub-drive 1) and a second sub-drive 104 (SRM sub-drive 2). Power to the first and second sub-drives are supplied from separate DC busses. In the case of the first sub-drive 102, power is supplied from the DC source 122 and capacitor C1 to a first DC bus 106. In the case of the second sub-drive 104, the power is supplied from capacitor C2 to a second DC bus 108. However, in order to insulate DC source 122 from the discharge energy of the phase coils in first sub-drive 102, the discharge energy is diverted to the second DC bus 108, where it is used to charge capacitor C2 and thus supply power to the second DC bus 108.

Figure 5:
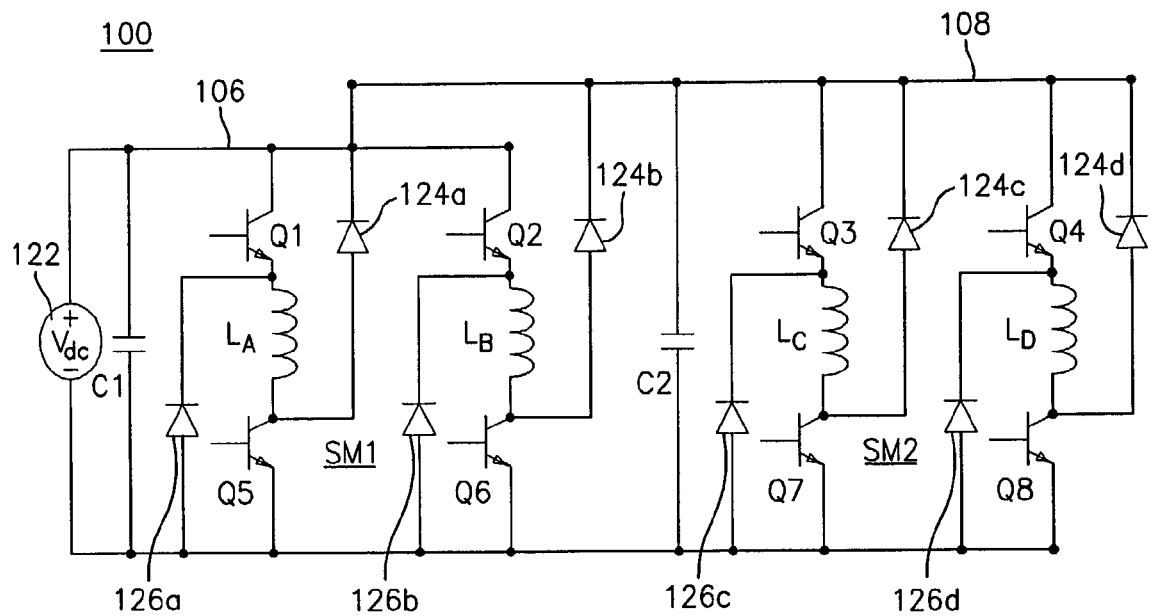
FIG. 5 is a schematic circuit diagram illustrating one possible embodiment of the dual stage SRM drive circuit of FIG. 4.

FIG. 5 is a schematic circuit diagram illustrating one possible embodiment of the dual stage SRM drive circuit 100 of FIG. 4. As is the case with the conventional circuit 20 of FIG. 2, the dual stage circuit 100 of FIG. 5 illustrates a four-phase SRM. Alternatively, a different number of phases may also be used. As can be seen, the first sub-drive is comprised of phase coils $L_A$ and $L_B$ (collectively denoted as SM1), while the second sub-drive is comprised of phase coils $L_C$ and $L_D$ (collectively denoted as SM2). The power to phase coils $L_A$ and $L_B$ is provided by DC source 122 and C1 through transistors Q1/Q5 and Q2/Q6, respectively. In addition, the power to phase coils $L_C$ and $L_D$ is provided by C2 through transistors Q3/Q7 and Q4/Q8, respectively. Although the switching transistors for the first sub-drive SM1 are connected to the first DC bus 106 and the switching transistors for the second sub-drive SM2 are connected to the second DC bus 108, each of the high-side freewheeling diodes 124a, 124b, 124c and 124d are connected to the second DC bus 108. In this manner, the discharge energy from $L_A$ and $L_B$ will be directed onto the second DC bus 108, thus preventing power feedback to DC source 122.

Figure 6A:
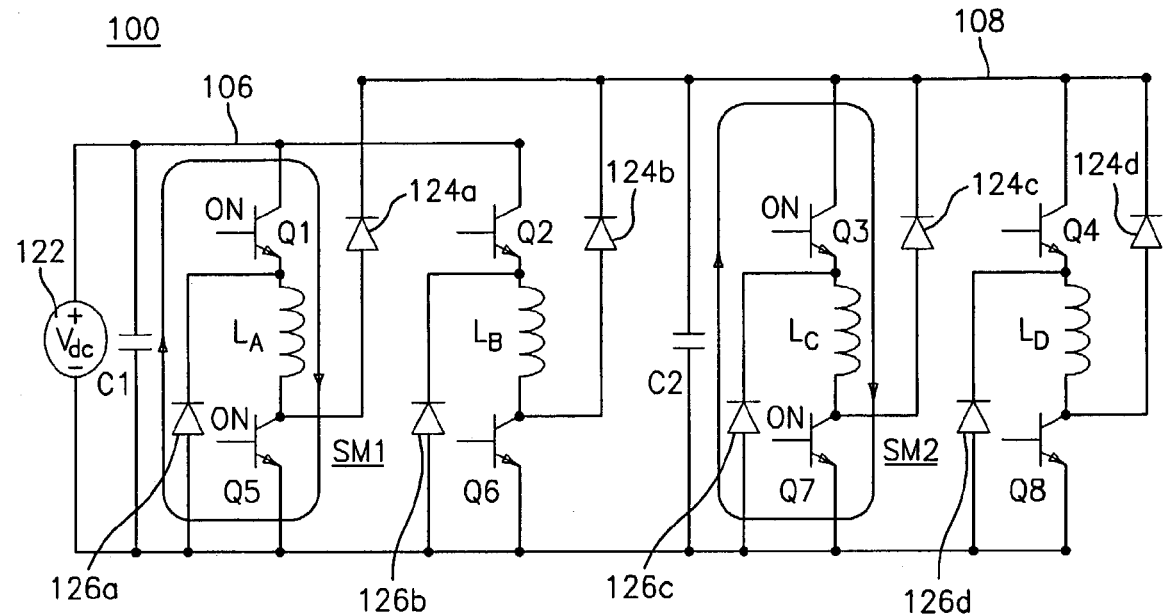
FIGS. 6(a) through 6(c) illustrate the dual stage SRM drive circuit of FIG. 5 during various conduction stages of the commutation cycle, with FIG. 6(c) particularly illustrating the phase coil current discharge to the second DC bus.
Figure 6B:
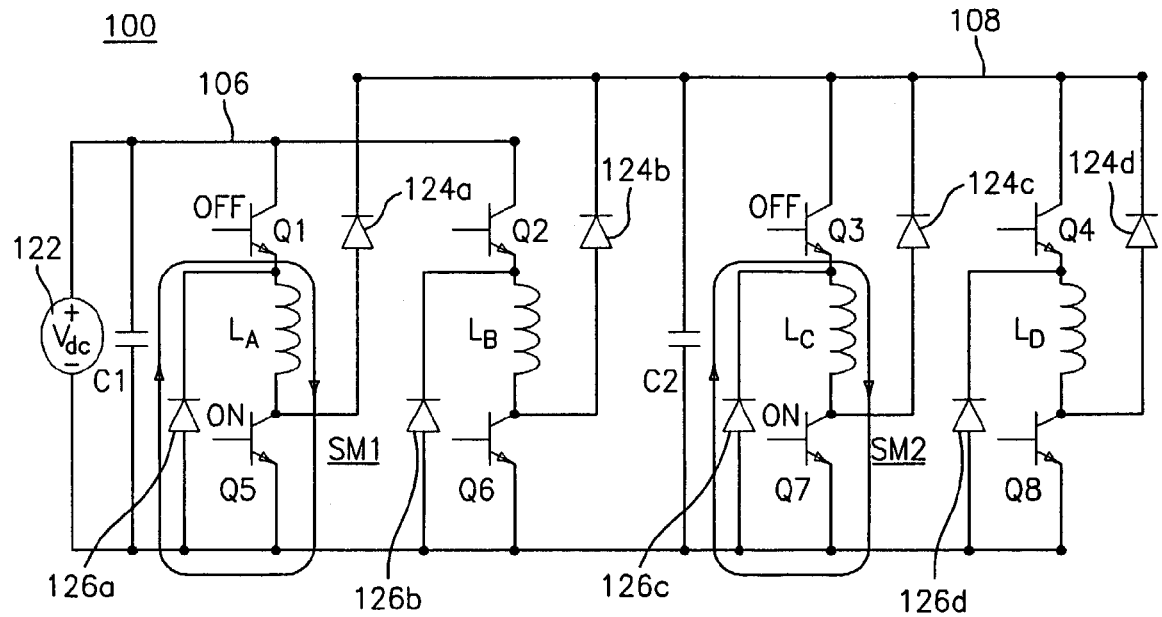
Figure 6C:
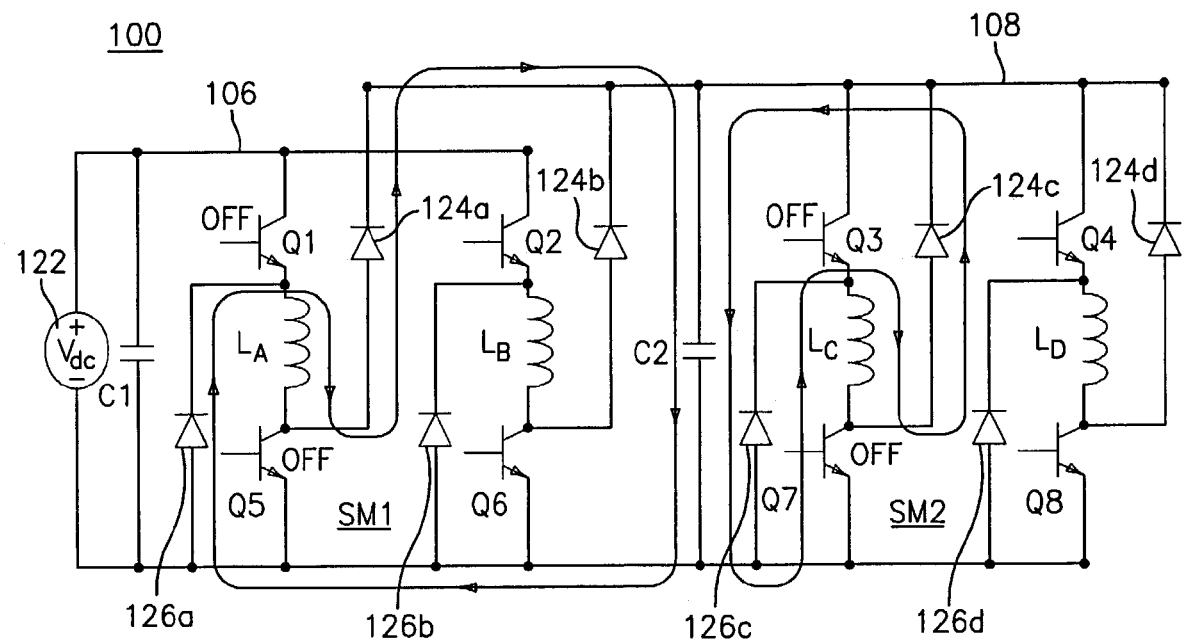

FIGS. 6(a) through 6(c) illustrate current flow through the dual stage drive circuit 100 during each conduction mode of the SRM 10. For case of description, only the current path through phases "A" and "C" (one in each DC bus) of the drive circuit 100 is shown in FIGS. 6(a) through 6(c) in order to demonstrate the conduction cycle. It will be noted that the demonstrated current flow through phases "A" and "C" do not necessarily occur simultaneously, but instead are only meant to compare the current flow through both sub-drives. As is shown in FIG. 6(a), the conduction in the motor phase "A" is commenced by turning on both high-side transistor Q1 and low-side transistor Q5. During this conduction mode, the current in phase "A" is supplied from DC source 122/C1 and passes through coil $L_A$ via conducting transistors Q1 and Q5. Likewise, the conduction in the motor phase "C" is commenced by turning on both high-side transistor Q3 and low-side transistor Q7. During this conduction mode, the current in phase "C" is supplied from C2 and passes through coil $L_C$ via conducting transistors Q3 and Q7.

The behavior of the current in both sub-drives is the same during the PWM mode, as shown in FIG. 6(b). When the high-side transistor of the corresponding phase is "off", the current continues to flow in the coil and through the low-side transistor. However, in order to regulate the energy transferred in to the second DC bus 108, the PWM operation may require that both the high and low-side transistors be turned off during phase current control. As shown in FIG. 6(*c*), during the freewheeling mode when Q1 and Q5 are both "off", the energy remaining in $L_A$ is dissipated as the current flows through high-side diode 124*a* into the second DC bus 108. In so doing, the remaining energy in $L_A$ is used to charge C2. The same is true following the activation and deactivation of $L_B$. Furthermore, on the second DC bus 108, phases "C" and "D", when discharging, also return current to C2, as illustrated by the current path through $L_C$.

Thus, regardless of which sub-drive or which particular phase coil is energized, the feedback energy in each case is directed toward C2 and not the DC source 122 since each of the high-side diodes are connected to the second DC bus 108. During the phase commutation mode, both transistor switches Q1 and Q5 will be constantly on to provide a fast removal of current from the phase. The principal of energy transfer to the second DC bus 108 remains the same as shown in FIG. 6(*c*).

Because of the dual stage nature of the SRM drive, the operating voltage of the first DC bus 106 may be different from the operating voltage of the second DC bus 108. In such a case, the phase windings in each sub-drive would be designed for its corresponding DC voltage, and the motor is thereby equivalent to two sub-motors of the same mechanical configuration. Preferably, these two sub-motors produce an equal amount of torque for a conventional SRM stator and rotor construction. As such, an SRM motor may easily be configured for a two-stage operation through a simple modification of the windings on the second DC bus 108, according to the operating voltage thereof.

Moreover, since the total SRM torque is effectively produced from two sub-motors, the SRM could further be designed to have SM1 produce the main torque while SM2 produces an auxiliary torque. In other words, for the embodiment of the four-phase SRM configuration 10, the two sub-motors are somewhat analogous to two, two-phase motors that are mounted on the same shaft, or that share the same magnetic circuitry and/or mechanical assembly. Again, it will be understood that the specific grouping of phase windings with respect to the sub-drives may be changed, depending upon the particular design approach of the SRM.

Figure 7:
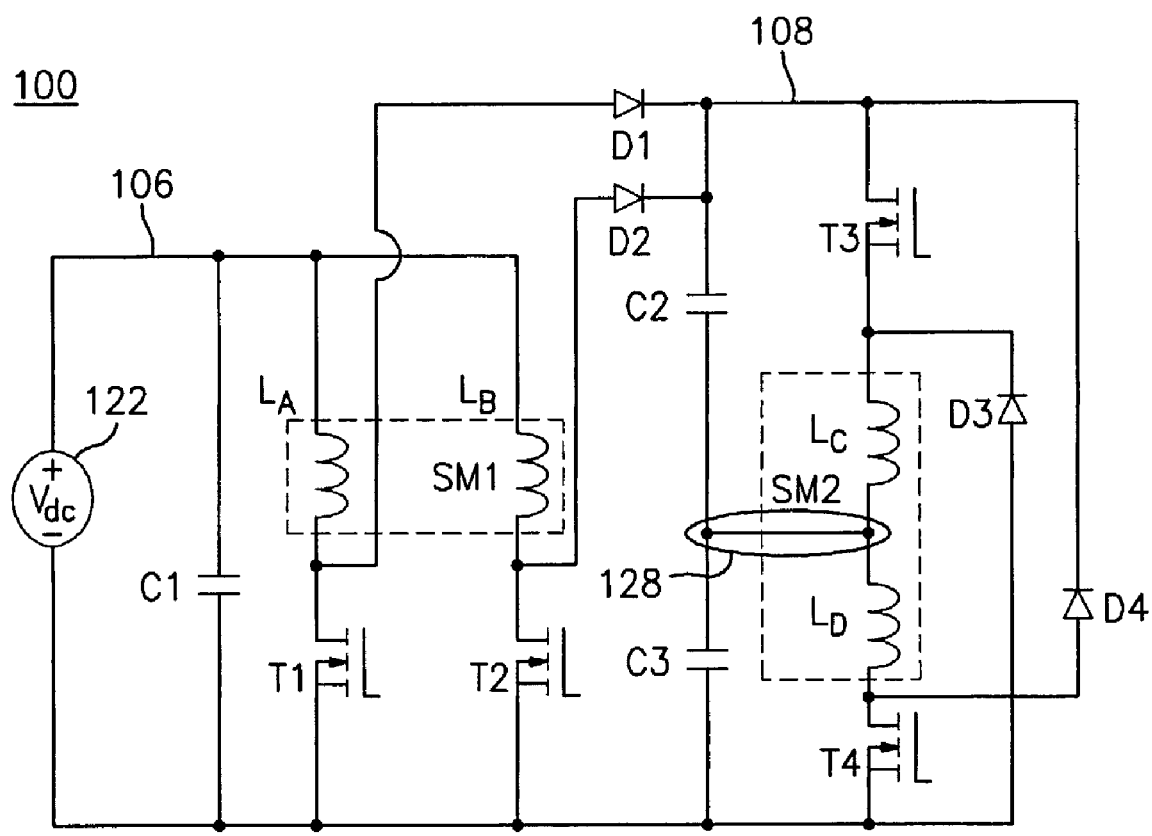
FIG. 7 is a schematic circuit diagram illustrating another possible embodiment of the dual stage SRM drive circuit of FIG. 4.

Finally, FIG. 7 is a schematic circuit diagram illustrating another possible embodiment of the dual stage SRM drive circuit 100 of FIG. 4, in which each phase coil of the drive circuit has just a single switching transistor and a single freewheeling diode associated therewith. This reduces the number of components in the drive circuit 100, while still providing the same energy dissipating improvements over a conventional, single stage configuration. As is shown, the energy in phase coils $L_A$ and $L_B$ (when T1 and T2 are switched off, respectively), are still dissipated through second DC bus 108 through freewheeling diodes D1 and D2, respectively. It will further be noted, however, in this embodiment, that the discharge energy from $L_A$ and $L_B$ is used to charge both capacitors C2 and C3, connected in series.

Further, in this embodiment, it will be noted that phase coils $L_C$ and $L_D$ of SM2 are also connected in series, and the currents therethrough are each controlled by a single transistor (T3 and T4, respectively). The series connection between C2 and C3 and the series connection between $L_C$ and $L_D$ is further connected to a common node 128. In this manner, it can be seen that the energy stored within C2 is used to provide phase current through $L_C$ when T3 is on, while the energy stored within C3 is used to provide phase current through $L_D$ when T4 is on. Moreover, the energy remaining in $L_C$ when T3 is off is discharged through freewheeling diode D3, thereby charging C3. Similarly, when T4 is off, the energy remaining in $L_D$ charges C2 through freewheeling diode D4.

As will be appreciated, the above described dual stage SRM drive embodiments improve the energy recovery process as compared with the conventional, single stage SRM drive. Current feedback from the drive to the battery source is eliminated by dumping the energy to the second DC bus 108 for direct utilization by the second sub-drive SM2. Since there is almost no energy feedback directly to the power source, no reverse current pulses are present at the input of the drive, and thus the current drawn from the battery is smoothed out and the EMI is reduced by 50% or more. In addition, the inductance of the SRM is used as a natural inductor for EMI filtering, and the motor housing is used as an EMI shielding. As such, the cost for meeting EMC requirements will be reduced.

Still a further advantage stems from the fact the dual stage drive provides for a faster demagnetization of the first sub-drive SM1, thereby making it possible for potential torque ripple reduction. Still another benefit from the reduction of ripple current in the DC link is the reduction of the link capacitance, which leads to lower drive costs. Accordingly, the potential exists for immediate performance improvements for specific applications such as brushless HVAC blower motors, fuel pump motors and electric caliper motor drives, to name a few.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dual stage drive for a switched reluctance motor (SRM), the SRM having a plurality of phase coils associated therewith, comprising:
    a first power source;
    a first power bus connected to said first power source to supply power thereto, said first power bus having at least one of the plurality of phase coils connected thereto, said at least one of the plurality of phase coils being powered by said power from said first power bus, said first power source being insulated from discharge energy of said at least one of the plurality of phase coils; and
    a second power bus connected to said at least one of the plurality of phase coils to receive said discharge energy, said second power bus having at least one other of the plurality of phase coils connected thereto; and
    a second power source connected to said second power bus to supply power thereto, said at least said one other of the plurality of phase coils being powered solely by said power from said second power bus, said second power bus utilizing said discharge energy to provide said power supplied to said second power bus.

2. The dual stage SRM drive of claim 1, wherein:
    said first power source comprises a DC power source; and
    said second power source comprises a capacitor, said capacitor utilizing said discharge energy for charging said capacitor to provide said power supplied to said second power bus.

3. The dual stage SRM drive of claim 2, wherein said second power bus is connected to said at least one of the plurality of phase coils through a freewheeling diode.

4. A dual stage drive for a switched reluctance motor (SRM) having a plurality of phase coils associated therewith, comprising:
a first power source coupled to a first plurality of said phase coils for supplying power thereto, said first power source being insulated from discharge energy of said first plurality of said phase coils; and
a second power source coupled to said first plurality of said phase coils for receiving said discharge energy therefrom, said second power source coupled to a second plurality of said phase coils for supplying power thereto, wherein said second plurality of said phase coils is powered solely by said second power source, said second power source utilizing said discharge energy to provide said power supplied to said second plurality of said phase coils.

5. The dual stage drive of claim 4, wherein:
said first power source comprises a DC power source; and
said second power source comprises a capacitor, said capacitor utilizing said discharge energy for charging said capacitor to provide said power supplied to said second plurality of said phase coils.

6. The dual stage drive of claim 5, wherein:
each of said first and second pluralities of said phase coils has a high-side switching transistor and a low-side transistor associated therewith;
said high-side switching transistors associated with said first plurality of said phase coils being coupled to a positive terminal of said DC power source;
said high-side switching transistors associated with said second plurality of said phase coils being coupled to said capacitor; and
said low-side switching transistor associated with both said first and said second pluralities of said phase coils being coupled to a negative terminal of said DC power source.

7. The dual stage drive of claim 6, wherein:
each of said phase coils has a high-side freewheeling diode and a low-side freewheeling diode associated therewith;
said high-side freewheeling diodes second coupled to said capacitor; and
said low-side freewheeling diodes coupled to said negative terminal of said DC power source.

8. The dual stage drive of claim 4, wherein each of said phase coils has a single switching transistor and a single freewheeling diode associated therewith.

9. The dual stage drive of claim 8, wherein said second power source comprises series connected capacitors, said capacitors utilizing said discharge energy for charging said capacitors to provide said power supplied to said second plurality of said phase coils.

10. The dual stage drive of claim 9, wherein:
energy dissipated through said freewheeling diodes associated with said first plurality of phase coils is used to charge said capacitors;
energy dissipated through said freewheeling diode associated with a first coil of said second plurality of said phase coils is used to charge one of said capacitors; and
energy dissipated through said freewheeling diode associated with a second coil of said second plurality of said phase coils is used to charge an other one of said capacitors.

11. A switched reluctance motor (SRM), comprising:
a rotor assembly having a plurality of salient rotor poles formed on an outer surface thereof;
a stator assembly having a plurality of salient stator poles and a plurality of motor phase coils associated with said stator poles; and
a dual stage drive circuit for energizing said plurality of motor phase coils, said drive circuit further comprising:
a first power source coupled to a first plurality of said motor phase coils for supplying power thereto, said first power source being insulated from discharge energy of said first plurality of said motor phase coils; and
a second power source coupled to said first plurality of said motor phase coils for receiving said discharge energy therefrom, said second power source coupled to a second plurality of said motor phase coils for supplying power thereto, wherein said second plurality of said motor phase coils is powered solely by said second power source, said second power source utilizing said discharge energy to provide said power supplied to said second plurality of said motor phase coils.

12. The SRM of claim 11, wherein:
said first power source comprises a DC power source; and
said second power source comprises a capacitor, said capacitor utilizing said discharge energy for charging said capacitor to provide said power supplied to said second plurality of said motor phase coils.

13. The SRM of claim 12, wherein:
each of said first and second pluralities of said motor phase coils has a high-side switching transistor and a low-side transistor associated therewith;
said high-side switching transistors associated with said first plurality of said motor phase coils being coupled to a positive terminal of said DC power source;
said high-side switching transistors associated with said second plurality of said motor phase coils being coupled to said capacitor; and
said low-side switching transistors associated with both said first and said second pluralities of said motor phase coils being coupled to a negative terminal of said DC power source.

14. The SRM of claim 13, wherein:
each of said motor phase coils has a high-side freewheeling diode and a low-side freewheeling diode associated therewith;
said high-side freewheeling diodes coupled to said capacitor; and
said low-side freewheeling diodes coupled to said negative terminal of said DC power source.

15. The SRM of claim 11, wherein each of said motor phase coils has a single switching transistor and a single freewheeling diode associated therewith.

16. The SRM of claim 15, wherein said second power source comprises series connected capacitors, said capacitors utilizing said discharge energy for charging said capacitors to provide said power supplied to said second plurality of said phase coils.

17. The SRM of claim 16, wherein:
energy dissipated through said freewheeling diodes associated with said first plurality of said motor phase coils is used to charge said capacitors;
energy dissipated through said freewheeling diode associated with a first coil of said second plurality of said motor phase coils is used to charge one of said capacitors; and
energy dissipated through said freewheeling diode associated with a second coil of said second plurality of said motor phase coils is used to charge an other one of said capacitors.

* * * * *